Aug. 14, 1923.

A. M. FORD

METAL WHEEL

Filed Sept. 16, 1921

1,464,566

INVENTOR.
Albert M. Ford
BY
Fay, Oberlin & Fay
ATTORNEYS

Patented Aug. 14, 1923.

1,464,566

UNITED STATES PATENT OFFICE.

ALBERT M. FORD, OF GENEVA, OHIO, ASSIGNOR TO THE GENEVA METAL WHEEL COMPANY, OF CLEVELAND, OHIO, A CORPORATION OF OHIO.

METAL WHEEL.

Application filed September 16, 1921. Serial No. 501,087.

*To all whom it may concern:*

Be it known that I, ALBERT M. FORD, a citizen of the United States, and a resident of Geneva, county of Ashtabula, and State of Ohio, have invented a new and useful Improvement in Metal Wheels, of which the following is a specification, the principle of the invention being herein explained and the best mode in which I have contemplated applying that principle, so as to distinguish it from other inventions.

The present invention, relating, as indicated to wheel hubs, is particularly directed to an improved construction of hub to be used for the wheels of wheelbarrows and similar vehicles, although the invention is, of course, not limited to that particular use. The principal object of the invention is to provide a wheel hub of simple inexpensive construction which shall combine the ability to withstand wear with the advantage of convenient disassembly for the purpose of renewing or repairing the bearings.

The annexed drawing and the following description set forth in detail certain mechanism embodying the invention, such disclosed means constituting, however, but one of the various mechanical forms in which the principle of the invention may be used.

In said annexed drawing:—

Figure 1:
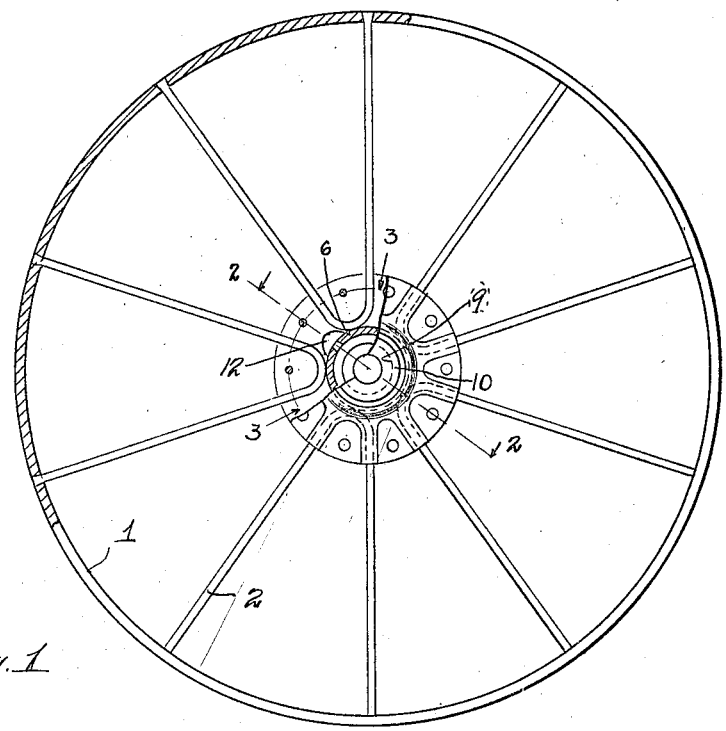
Figure 2:
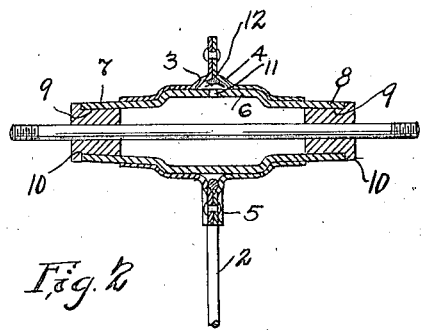
Figure 3:
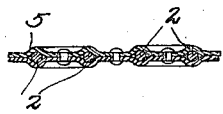

Fig. 1 is a side elevation of a wheel embodying my improved hub construction, the wheel being partially in section to show such hub; Fig. 2 is a transverse section through the hub on the line 2—2 in Fig. 1; and Fig. 3 is a section on line 3—3 in Fig. 1.

The present hub is particularly designed to be employed on that type of wheels where the spokes are formed of bent rods or strips of wire such as is shown in Fig. 1. In such a wheel the rim 1 carries a series of spokes 2, two adjacent spokes being formed of one length of rod or wire, the wire being doubled back upon itself at the center of the wheel. The redoubled inner end portions of the spokes are held in their proper position by means of disks 3 and 4 which are pressed closely together and which are provided with complementary semi-cylindrical recesses 5, for snugly receiving therein these redoubled ends of the spokes.

This type of wheel construction is in common use and is extremely economical to manufacture and very serviceable in use.

My improvements consist in the use of a hub member 6, which is formed from an ordinary short length of common black iron pipe, the ends 7 and 8 of which are swaged down to a smaller diameter than the center portion of the hub. These reduced end portions are very slightly tapered and are adapted to receive therein metal bushings 9, each of which is forced into the hub under pressure. Each bearing is provided with an expanding flange 10 which abuts against the upper end of the tapered end portion of the hub and prevents movement of the bearings toward the center of the hub while the very slight taper on the hub prevents any movement in the opposite direction.

The hub is provided with an opening 11 which is formed in the center of the hub and into which is driven a radial driving pin 12 or lug. This pin 12 fits into properly formed complementary recesses in the two disks 3 and 4 and serves to lock together the disks and spokes and the hub itself. One or more of these driving pins may be used, although I have found a single pin to be sufficient for most purposes.

The advantages of the present hub are that it can be made at an extremely low cost due to the material which is used for the hub proper, while the bearings 9 can be removed when worn and new bearings substituted therefor with slight trouble, the tapered end portions of the hub serving to prevent the bearings from working out of place when in use, but at the same time allowing these bearings to be readily removed when necessary for inspection, repair or replacement.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a metal wheel, the combination of a hub comprising a tubular member having its ends swaged down to a smaller diameter than the center portion, complementary disks for clamping the spokes of the wheel, said disks being formed with annular flanges sleeve-fitted on the respective ends of said member, and interchangeable bushings fitted within said member and adapted to receive the spindle of said wheel.

2. In a metal wheel, the combination of a hub comprising a tubular member having its ends swaged down to a smaller diameter than the center portion, complementary disks for clamping the spokes of the wheel, said disks being formed with annular flanges sleeve-fitted on the respective ends of said member, a radially projecting lug on the central portion of said member interlocking with said disks, and interchangeable bushings fitted within said member and adapted to receive the spindle of said wheel.

3. In a metal wheel, the combination of a hub comprising a tubular member having its ends swaged down to a smaller diameter than the center portion, complementary disks for clamping the spokes of the wheel, said disks being formed with annular flanges sleeve-fitted on the respective ends of said member, and metal bushings press-fitted in the respective ends of said member and adapted to receive the spindle of said wheel, said bushings being retained against outward movement by the taper of said member and being formed with flanges preventing inward movement thereof.

4. In a metal wheel, the combination of a hub comprising a section of iron pipe having its ends swaged down to a smaller diameter than the central portion, complementary disks for clamping the spokes of the wheel, said disks being formed with annular flanges sleeve-fitted on the respective ends of said member, and interchangeable metal bushings fitted within said member and adapted to receive the spindle of said wheel.

Signed by me, this 10th day of September, 1921.

ALBERT M. FORD.